US006171046B1

(12) United States Patent
Nutcher

(10) Patent No.: US 6,171,046 B1
(45) Date of Patent: Jan. 9, 2001

(54) APPARATUS FOR RETRIEVING AND STACKING BALES

(76) Inventor: Rick A. Nutcher, 5213 W. Grayson Rd., Modesto, CA (US) 95358

( * ) Notice: Under 35 U.S.C. 154(b), the term of this patent shall be extended for 0 days.

(21) Appl. No.: 09/267,910

(22) Filed: Mar. 4, 1999

(51) Int. Cl.[7] .......... A01D 87/12

(52) U.S. Cl. .......... 414/24.5; 414/245; 414/501; 414/789.7

(58) Field of Search .......... 414/25, 24.5, 789.7, 414/501, 245, 679, 493, 505

(56) References Cited

U.S. PATENT DOCUMENTS

| | | | |
|---|---|---|---|
| 3,402,832 | 9/1968 | Wehde . | |
| 3,487,955 | 1/1970 | Brown . | |
| 4,329,101 | 5/1982 | Green et al. . | |
| 4,498,829 | 2/1985 | Spikes . | |
| 4,952,111 | 8/1990 | Callahan . | |
| 4,971,504 * | 11/1990 | Klompien | 414/111 |
| 5,062,757 * | 11/1991 | Eichenauer | 414/25 |
| 5,397,208 * | 3/1995 | Siebenga | 414/111 |
| 5,405,229 | 4/1995 | Tilley et al. . | |
| 5,882,163 * | 3/1999 | Tilley | 414/111 |
| 5,921,738 * | 7/1999 | Rempel | 414/111 |
| 6,024,534 * | 2/2000 | Stevenson | 414/800 |

* cited by examiner

*Primary Examiner*—Joseph A. Fischetti
(74) *Attorney, Agent, or Firm*—Thomas R. Lampe

(57) ABSTRACT

Apparatus for retrieving and stacking bales includes bale engagement and transport mechanism to individually transport bales engaged by the apparatus from the ground to a location on a support platform. A bale displacement member repositions the bale on the support platform to allow room for a subsequent bale. The apparatus includes mechanical linkage of a specific character which includes two link members relatively pivotally movable during a portion of the bale placement procedure and locked together during another portion of the procedure.

16 Claims, 7 Drawing Sheets

72
22
22
66
12
64
10
34
32
30
28
14
28
16
28

72
74
32
34
30
40
44
46
28
14
16
20
18
2
2
64
12
18

10
32
34
64
30
66
12
22
46
14
18

64
44
40
42
66
42
12
26
14
18
20
16
24

42
20
14
30
34
24
50
42
40

18
12
46
44

APPARATUS FOR RETRIEVING AND STACKING BALES

TECHNICAL FIELD

This invention relates to apparatus for retrieving and stacking bales. The invention is particularly applicable for use in retrieving large bales disposed in a field and stacking the large bales.

BACKGROUND OF THE INVENTION

A number of bale stacker and retriever systems for use in a field are known in the prior art. U.S. Pat. No. 5,405,229, issued Apr. 11, 1995, for example, discloses a self propelled "big bale" stacker and retriever wherein bales are serially retrieved from the ground and placed on a rotating support table. The apparatus is so constructed as to limit the capacity of the rotatable platform to two bales disposed side by side. After one bale has been positioned on the rotatable table the table is rotated 180° to accommodate a second bale placed therein next to the first bale. As will be seen below, apparatus constructed in accordance with the present invention allows for efficient side by side placement of more than two bales on a support platform without requiring rotation of the support platform.

Other patents disclosing bale stacking and retrieving systems are as follows: U.S. Pat. No. 4,952,111, issued Aug. 28, 1990, U.S. Pat. No. 4,329,101, issued May 11, 1982, U.S. Pat. No. 4,498,829, issued Feb. 12, 1985, U.S. Pat. No. 3,487,955, issued Jan. 6, 1970, and U.S. Pat. No. 3,402,832, issued Sep. 24, 1968.

None of the above-identified patents illustrate the unique combination of structural elements disclosed herein which cooperate in a novel manner to efficiently and reliably retrieve and stack bales.

The present invention is characterized by its relative simplicity, efficiency and ease of use as well as by its ability to accumulate and stack more than two large bales disposed side by side. In addition, apparatus constructed in accordance with the teachings of the present invention incorporates a novel and reliable bale engagement and transport system which is operable to completely invert a bale and place the bale in inverted condition directly over and in close proximity to a mobile support platform prior to placement of the bale on the mobile support platform, lessening the possibility of bale damage during the process.

DISCLOSURE OF INVENTION

The present invention relates to apparatus for retrieving and stacking bales. The apparatus includes a mobile frame on which is disposed a support platform having an upper bale support surface.

Bale engagement and transport means is connected to the mobile frame for engaging bales on the ground seriatim during movement of the mobile frame and for individually transporting each engaged bale from the ground to a predetermined location on the upper bale support surface of the support platform.

Bale displacement means is provided for contacting a bale supported by the support platform at the predetermined location to displace the bale contacted thereby along the upper bale support surface thereof away from the predetermined location to provide room at the predetermined location for another bale subsequently transported by the bale engagement and transport means to the predetermined location.

The bale engagement and transport means comprises at least one bale engagement member and lifter means operatively associated with the bale engagement member to lift a bale engaged by the bale engagement member, invert the bale and deposit the bale on the upper bale support surface of the support platform at the predetermined location in upside down condition.

The means operatively associated with the bale engagement member includes prime mover means connected to the bale engagement member and mechanical linkage connected to the bale engagement member and the mobile frame. The mechanical linkage includes a first link member connected to the bale engagement member and pivotal therewith under the urging of the prime mover means about a first pivot to lift a bale from the ground and tilt the bale end-wise to a first orientation with the bale extending upwardly from a bale end and a second link member operatively associated with the first link member and pivotable about a second pivot along with the first link member and the bale under the urging of the prime mover means to further tilt the bale to upside down condition and deposit the bale on the upper bale support surface of the support platform at the predetermined location in upside condition.

Other features, advantages, and objects of the present invention will become apparent with reference to the following description and accompanying drawings.

BEST MODE FOR CARRYING OUT THE INVENTION

Figures 1, 2:
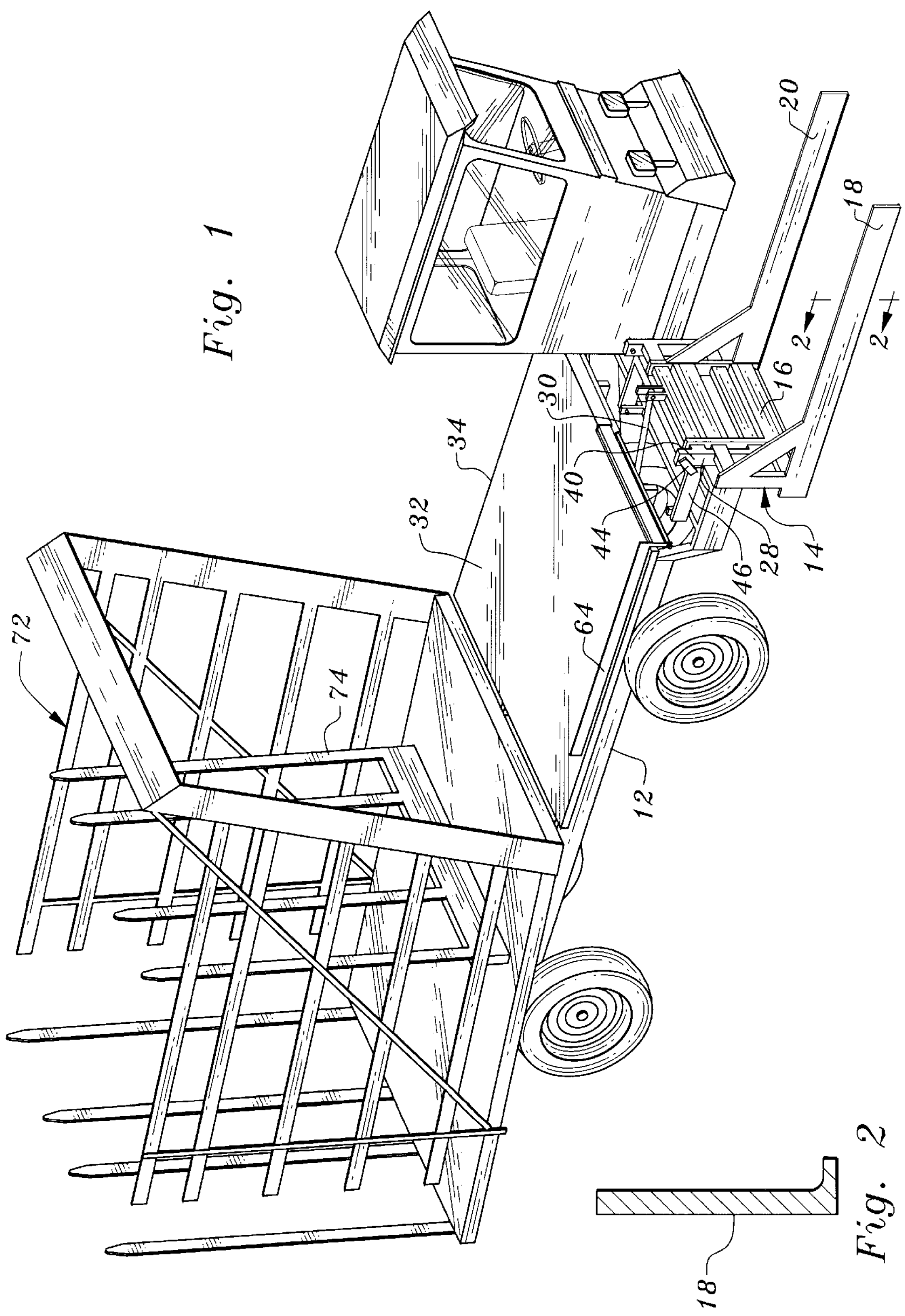
FIG. 1 is a frontal, perspective view of apparatus constructed in accordance with the teachings of the present invention.
FIG. 2 is an enlarged cross sectional view taken along the line 2—2 of FIG. 1.

Referring now to the drawings, self-propelled apparatus constructed in accordance with the teachings of the present invention includes a cab 10 attached to and supported by a wheeled frame 12.

Pivotally attached to frame 12 at the front end of the frame and alongside cab 12 is an assembly 14 including a bale contact member 16 connected to bale engagement members 18, 20.

Figure 3:
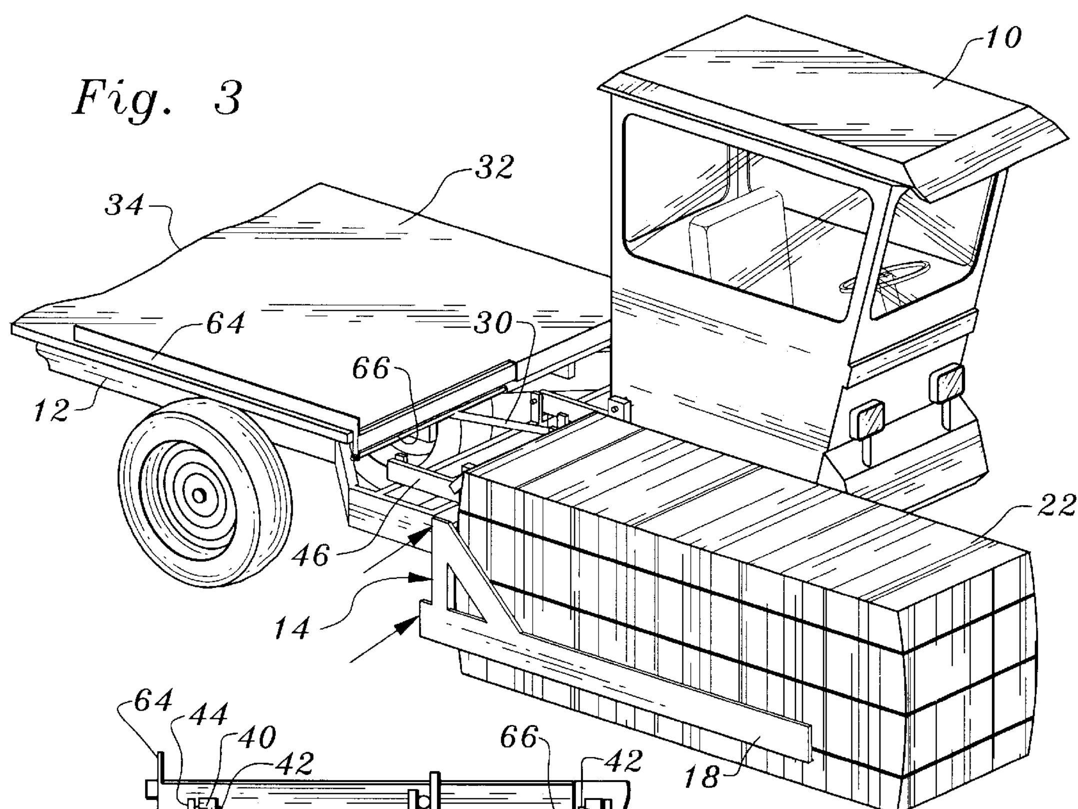
FIG. 3 is a perspective view illustrating a portion of the apparatus with a bale engagement member being brought into engagement with a large bale.

During operation of the apparatus the apparatus is maneuvered to approach a bale 22 end-wise as shown in FIG. 3 to place the bale between bale engagement members 18, 20 with the bale end in contact with bale contact member 16. Bale engagement member 18 is then moved in the direction shown by the arrows in FIG. 3 toward bale engagement member 20 which, in the arrangement illustrated, is fixed in position relative to bale contact member 16.

Figure 4:
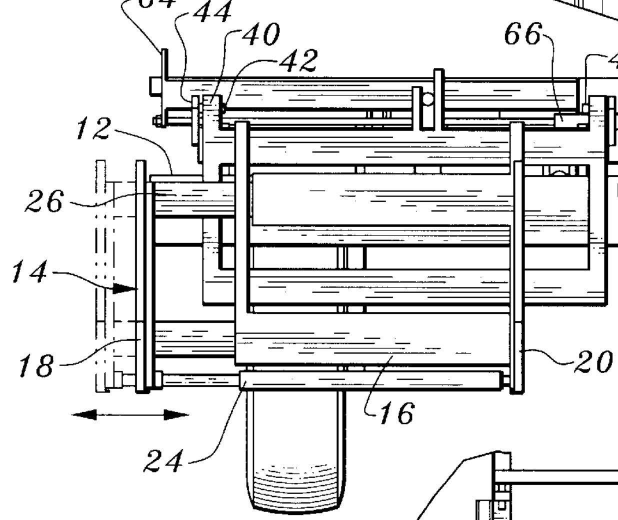
FIG. 4 is a frontal view of a selected portion of the apparatus including bale engagement and transport structure and bale displacement structure.
Figure 5:
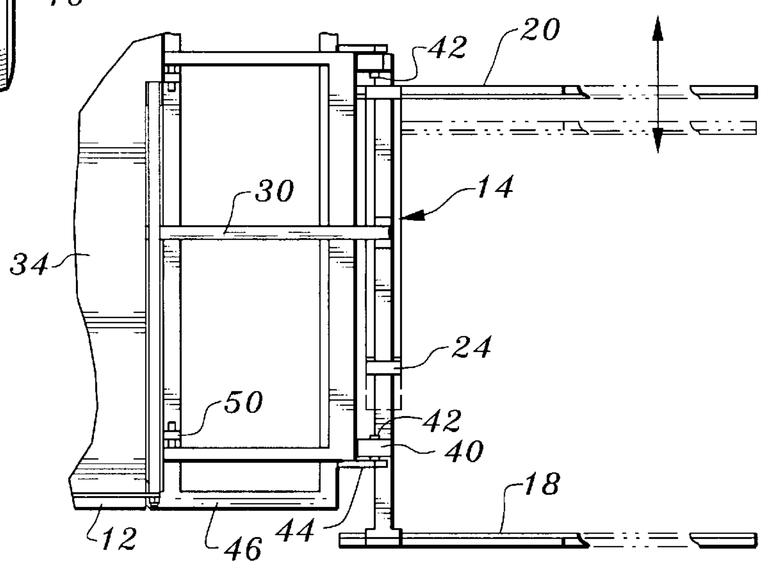
FIG. 5 is a plan view illustrating features of the bale engagement and transport structure.

Movement of bale engagement member 18 is accomplished by a hydraulic cylinder 24 which is part of assembly 14. FIG. 4 illustrates the bale engagement member 18 in two positions, one shown in phantom line and one shown in solid line. The clamping position is the solid line position. Hydraulic cylinder 24 is operable to move bale engagement member 18 back and forth as desired, as shown by the double headed arrow. A slide member 26 is affixed to the bale engagement member 18 and is slidable with bale engagement member 18 relative to the remainder of the assembly to stabilize bale engagement member 18. If desired, suitable means (not shown) may be employed to adjust the positioning of bale engagement member 20 relative to bale contact member 16 to adjust for different sized bales. This feature is illustrated in FIG. 5, the double headed arrow in that FIG. depicting directions of adjustment and the bale engagement member shown in two alternate positions by solid and phantom line depictions.

Figure 6:
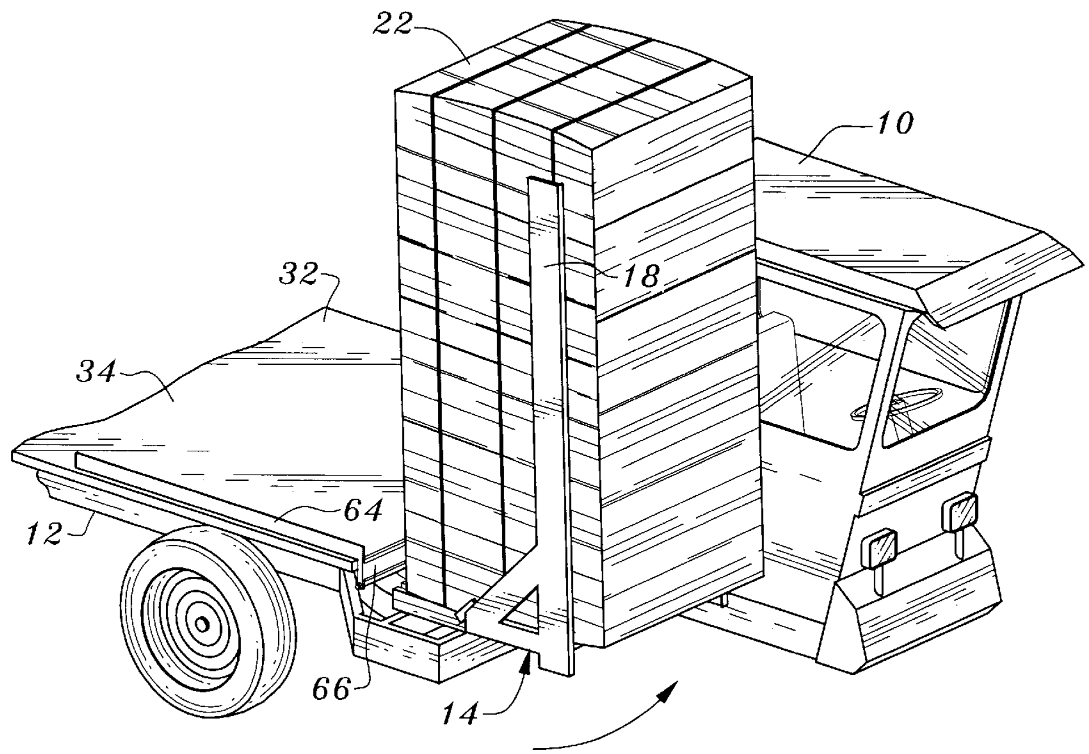
FIG. 6 is a view similar to FIG. 3 but illustrating a bale being moved to an intermediate position by the bale engagement and transport structure.
Figure 7:
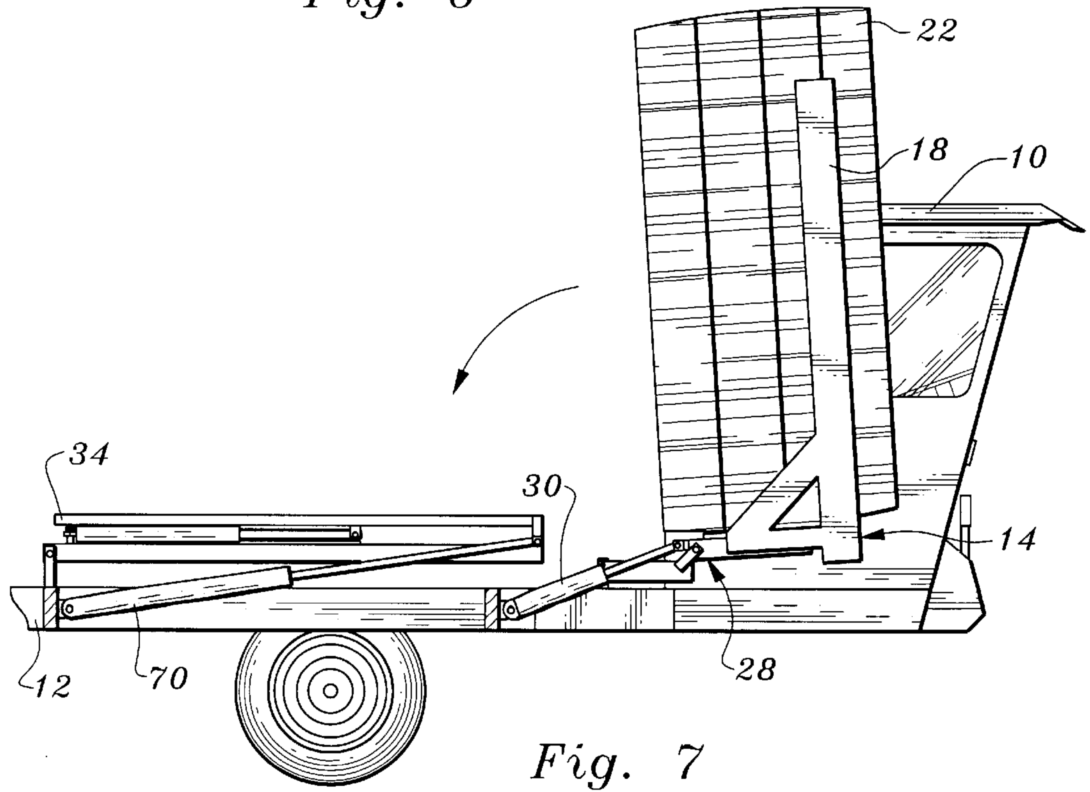
FIG. 7 is a side elevational view showing the bale in intermediate position and prior to placement on a support platform of the apparatus.

After the captured bale has been clamped between bale engagement members 18 and 20, the assembly 14 including bale contact member 16 and the bale engagement members is pivoted along with the bale 22 to the position shown in FIGS. 6 and 7 wherein the bale has been lifted and tilted end-wise to a generally vertical orientation with the bale extending upwardly from a bale end. The mechanism for accomplishing this lifting operation will be described below in detail. Suffice it to say that the means for transporting the bale from the ground includes mechanical linkage 28 and a prime mover in the form of a hydraulic cylinder 30.

Figure 10:
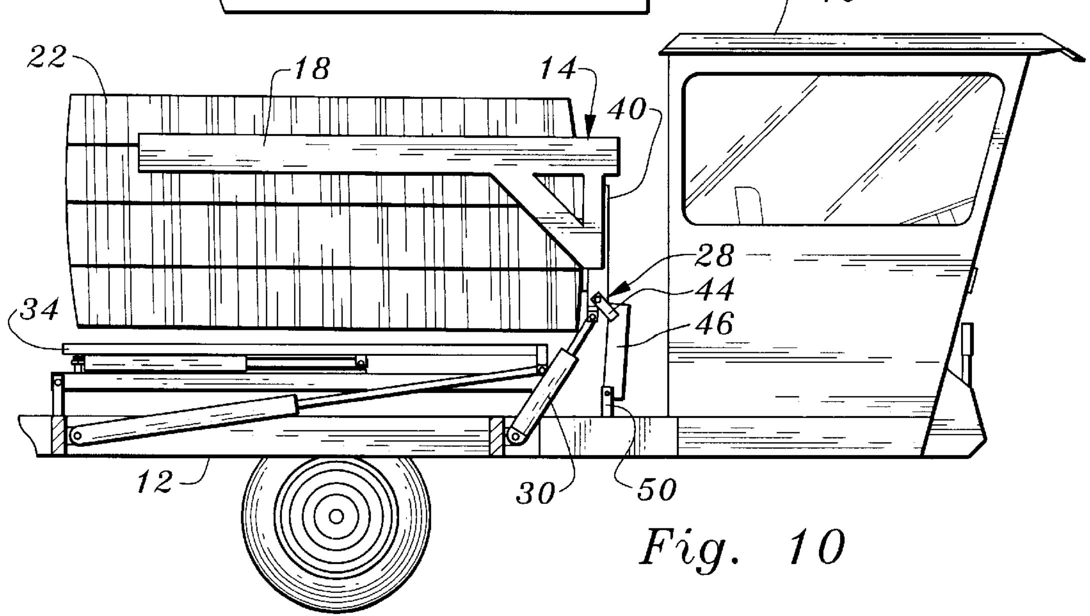
FIG. 10 is a view similar to FIG. 7 but illustrating the bale in fully inverted or upside down condition and just prior to positioning of the bale on the support platform.

The assembly 14 through cooperation with the hydraulic cylinder 30 and mechanical linkage 28 moves the bale from the intermediate position shown in FIG. 7 to the position shown in FIG. 10 wherein the bale 22 has been completely inverted and is an in an upside down condition over the upper bale support surface 32 of a support platform 34 rotatably mounted relative to mobile frame 12. After the bale has been placed in this position closely adjacent to the upper bale support surface the pneumatic cylinder 24 operatively associated with bale engagement member 18 is actuated to unclamp the bale and allow the bale to drop a short distance onto the upper bale support surface of the support platform at a predetermined location thereon.

After the bale 22 has been discharged hydraulic cylinder 30 moves assembly 14 back to the position shown in FIG. 1 so that another bale may be retrieved and transported.

The mechanical linkage 28 is of a unique character and is cooperable with the hydraulic cylinder 30 in a unique manner to reliably and quickly transport a captured bale 22 and place the bale closely adjacent and substantially parallel to the surface 32 of support platform 34 prior to release of the bale by the bale engagement members 18, 20.

A mechanical linkage 28 is disposed at each end of bale contact member 16. That is, a mechanical linkage 28 is disposed on opposed sides of the piston shaft of hydraulic cylinder 30.

The piston shaft itself is attached to the upper end of bale contact member 16. In the interest of simplicity, only one mechanical linkage 28 will be described, the linkage on the left hand side of bale contact member 16 as viewed in FIG. 1, it being understood that the mechanical linkage 28 on the other side thereof is identical or virtually identical thereto.

Mechanical linkage 28 includes a first link member 40 attached to a side of the bale contact member 16 and thus connected to bale engagement member 18. First link member 40 is pivotally mounted about a pivot shaft 42 (see FIGS. 4, 5, 8 and 9) extending from a support plate 44 welded or otherwise secured to a second link member 46. In turn, second link member 46 is pivotally connected to frame 12 at a pivot 48 projecting from a plate 50 welded or otherwise secured to frame 12. In the interest of clarity, support plate 44 is not shown in FIGS. 8 and 9.

Retraction of the piston shaft of hydraulic cylinder 30 will cause the first link member 40 to pivot about its associated pivot shaft 42 along with bale contact member 16 and the bale engagement members. When the assembly 14 and bale 22 held thereby reach the positions illustrated in FIGS. 6 and 7, the first link member 40 will be brought into abutting engagement with second link member 46 as shown in FIG. 8.

Continued retraction of the shaft of hydraulic cylinder 30 will cause the engaged first and second link members 40, 46 to pivot as a unit about pivot 48 at support plate 50. This action is illustrated by the arrow in FIG. 8 and is also shown in FIG. 9 where the link members have pivoted to some extent and further tilt the bale 22.

Pivotally connected to link member 46 at pivot pin 54 is a generally L-shaped lock member 56. Lock member 56 is continually biased in a clockwise direction as viewed in FIGS. 8 and 9 by a coil tension spring 58.

Figure 8:
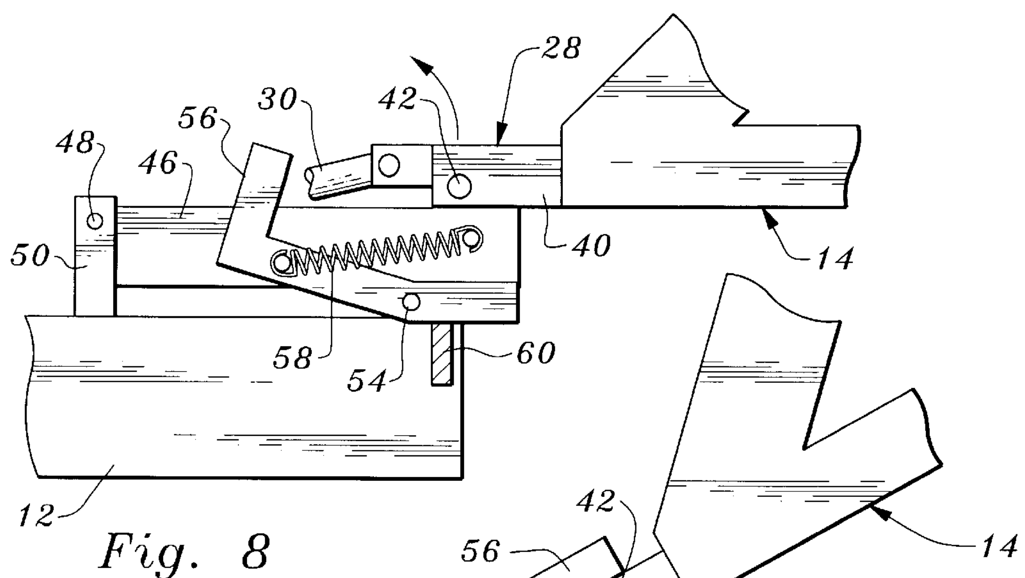
FIG. 8 is an enlarged elevational side view illustrating mechanical linkage and lock means in the relative positions assumed thereby when the bale is in the intermediate position shown in FIG. 7.
Figure 9:
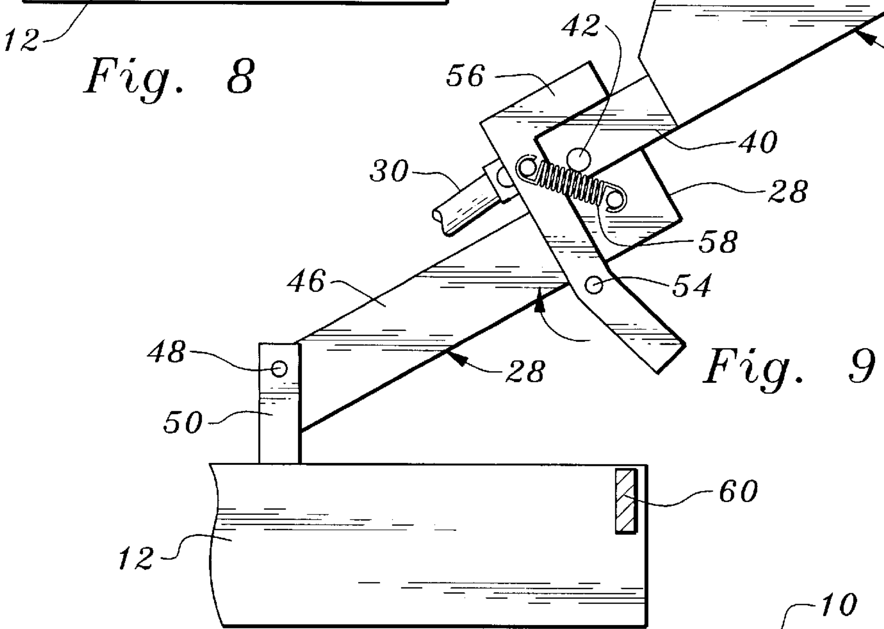
FIG. 9 is a view similar to FIG. 8 but illustrating the relative positions assumed by the link members and lock when the bale is being moved from the intermediate position of FIG. 7 to fully inverted position on the support platform.

When the link member 46 is in the position illustrated in FIG. 8 the lock member 56 is prevented from rotating under the urging of spring 58 due to engagement between the lock member 56 and a portion 60 of the frame. However, pivotal movement of link member 46 will cause the lock member to disengage itself from the frame portion 60 and allow the lock member to rotate clockwise under the urging of spring 58. This results in a distal end of the lock member passing over and into engagement with link member 40. This will lock the link members 40 and 46 against relative movement.

Continued retraction of the shaft of hydraulic cylinder 30 will cause the assembly and bale and mechanical linkage to assume the relative positions shown in FIG. 10. After the bale has been discharged onto the support platform 34 the shaft of hydraulic cylinder will be extended and return the elements of the assembly 14 and mechanical linkage to their initial positions, the lock member 56 being released to allow relative movement between the link members when the lock member reengages frame portion 60.

Figure 11:
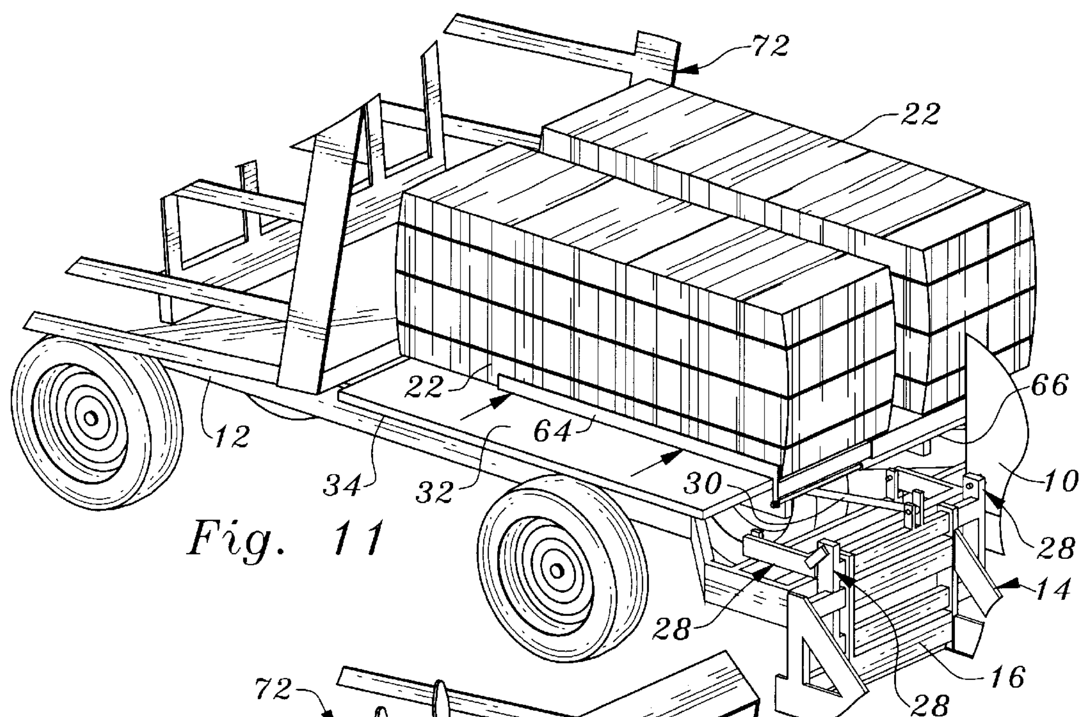
FIG. 11 is a perspective view of selected components of the apparatus and showing two bales positioned side by side on the support platform and a pusher member movably mounted relative to the support platform engaging one of the bales and pushing the bale toward the other bale on the platform.

A bale engaged and transported as just described occupies a position immediately behind the assembly 14 on the upper bale support surface of support platform 34. The bale so placed must be moved to allow placement of a subsequent bale on the support platform. This is accomplished by a pusher member 64 which engages a side of the bale and displaces the bale along the upper bale support surface. Pusher member 64 is moved by a hydraulic cylinder 66 attached to the pusher member at the end of the piston shaft thereof. FIG. 11 shows the pusher member 64 displacing the second of two bales previously applied to the support platform, making way for a third bale after the second bale has been displaced and the pusher member is returned to its initial position.

Figure 12:
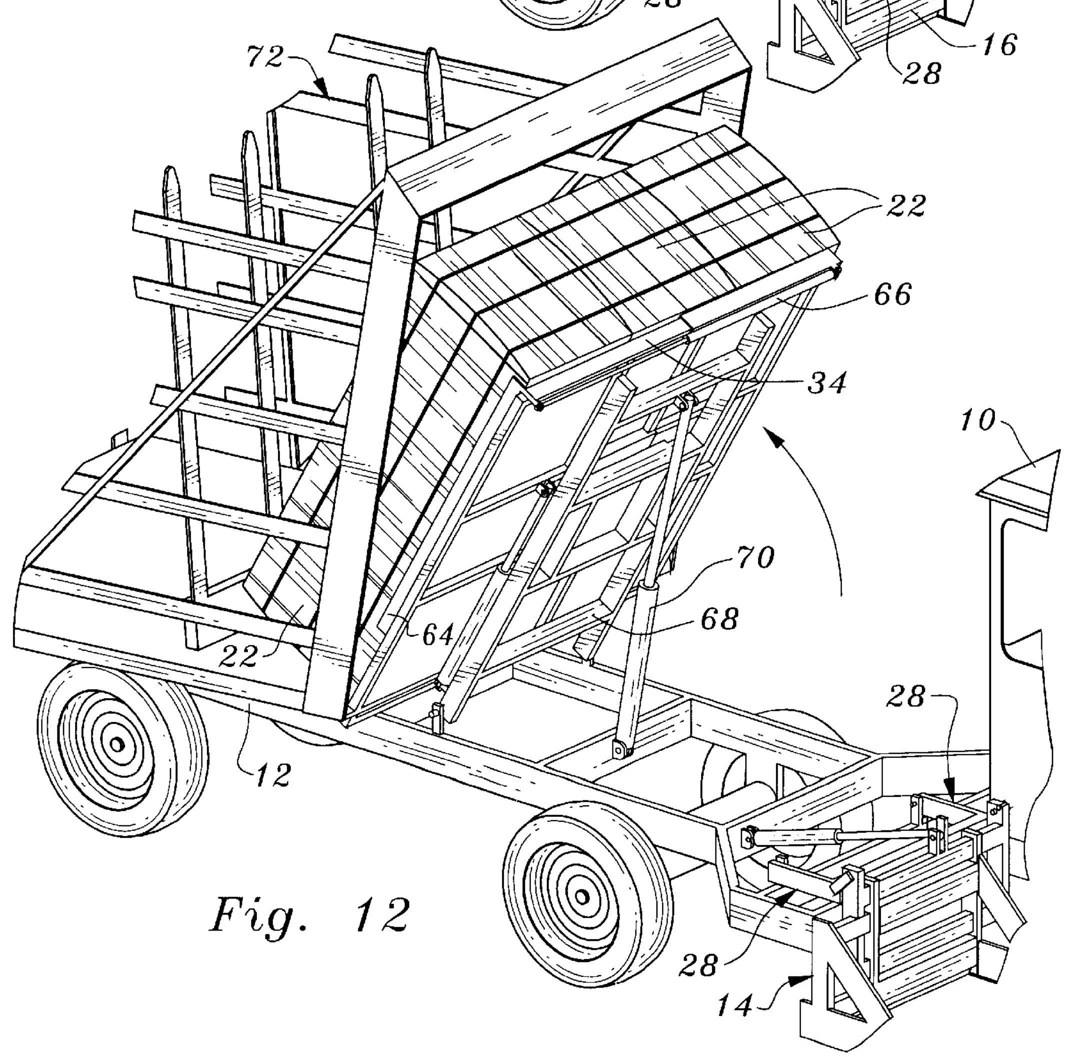
FIG. 12 is a perspective view illustrating three large bales on the platform and the platform being tilted to position the bales on end in a storage compartment of the apparatus.

After three bales have been positioned side by side, the support platform 34 is tilted as shown in FIG. 12. The support platform 34 is connected to and disposed over a frame section 68 which is pivotally attached to the remainder of the frame. Tilting is accomplished by a hydraulic cylinder 70 which is located between the pivotal frame section 68 and the remainder of frame 12.

Tilting of the frame section 68 and support platform will result in the three bales 22 disposed on the support surface of the platform being disposed on end within a storage compartment 72 of the apparatus. Storage compartments of this nature per se are known and have been employed previously in connection with bale retrievers and stackers. Since such feature per se forms no part of the present invention and is well known, it will not be described in detail. Suffice it to say, however, that the storage compartment 72 has disposed therein a movable support or wall 74 which moves in response to filling of the storage compartment while maintaining stability of the bales prior to complete filling of the compartment.

Figure 13:
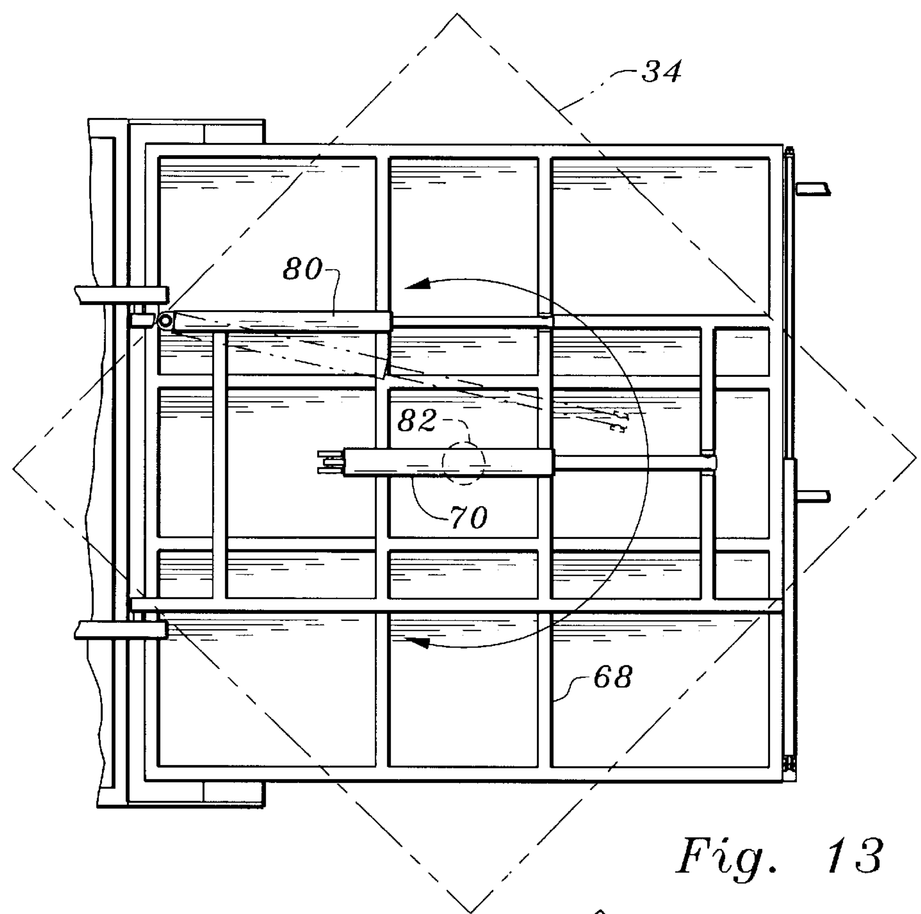
FIG. 13 is a somewhat schematic plan view illustrating the platform structure and depicting in phantom line a position assumed by the rotatable support platform portion during rotation thereof.

Support platform 34 is rotatably mounted on pivotal frame section 68 by any suitable pivotal mounting arrangement. FIG. 13 illustrates the support platform 34 in midstage of being rotated ninety degrees relative to frame section 68. This may be accomplished in any desired fashion. FIG. 13 illustrates use of a hydraulic cylinder 80 to accomplish rotation, one end of the cylinder device being attached to frame section 68 and the other connected to the bottom of support platform 34. The platform is rotatably mounted on a central pivot member 82 illustrated by dash lines. Extension or retraction of the hydraulic cylinder shaft will result in either clockwise or counter clockwise movement of the support platform about the central pivot member 82.

Figure 14:
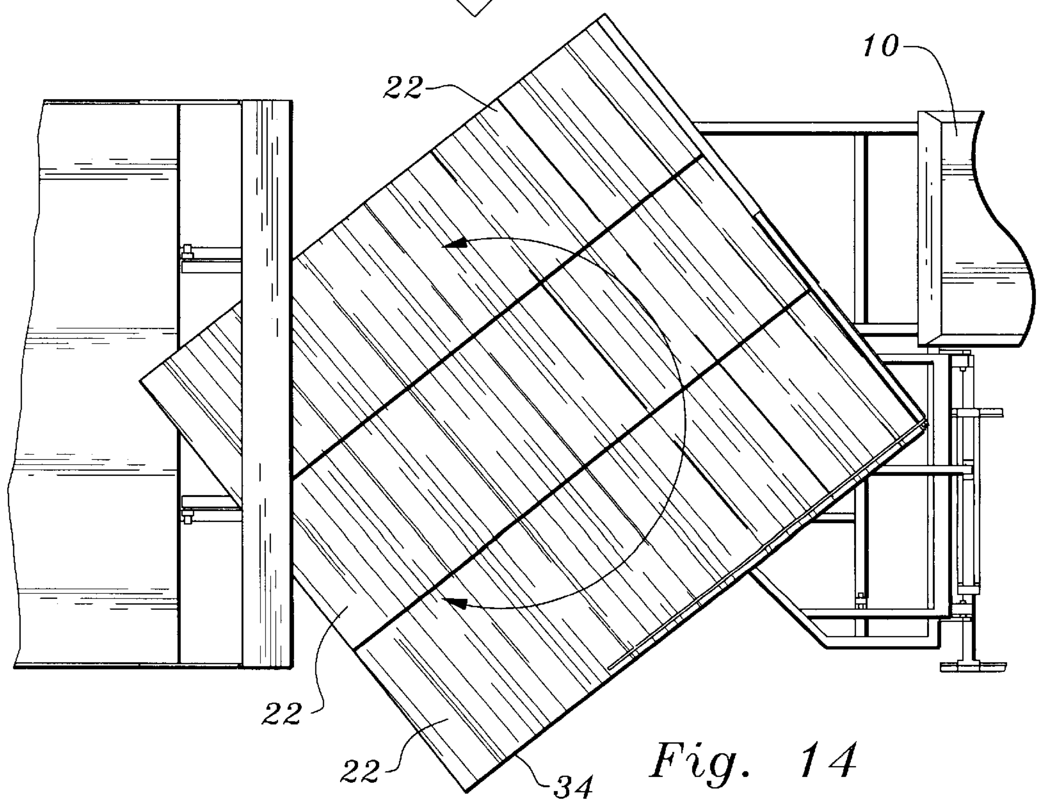
FIG. 14 is a plan view illustrating an intermediate position assumed by the rotatable support platform during rotation thereof.

When stacking bales it is desirable to alternate the orientation of the layers of the stack ninety degrees to maintain a stable stack structure. The rotatable support platform 34 results in the bales being oriented in a desired fashion preparatory to discharge thereof into the storage compartment. FIG. 14 is a plan view showing movement of the support platform with three bales thereon.

Figure 16:
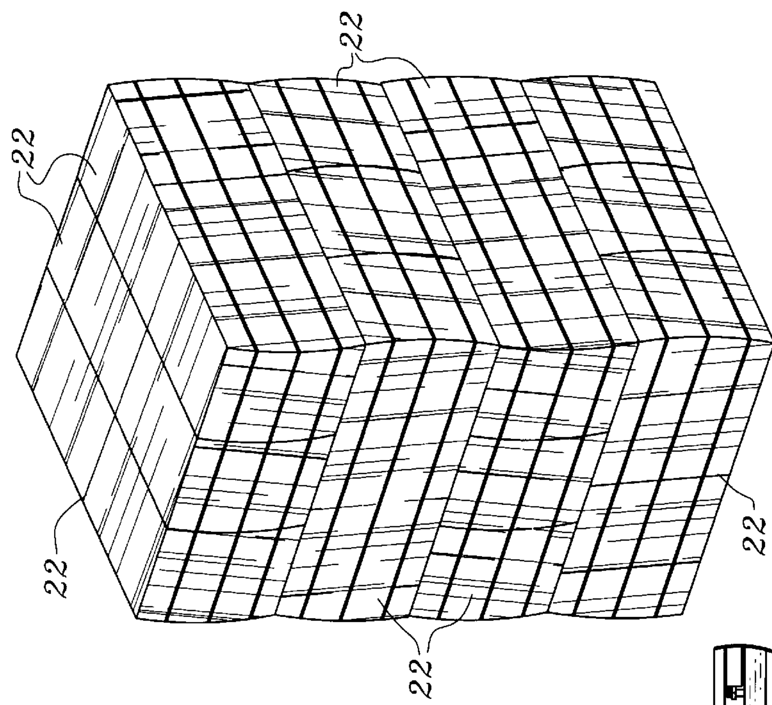
FIG. 16 is a perspective view of a stack of bales after discharge thereof from the apparatus.
Figure 15:
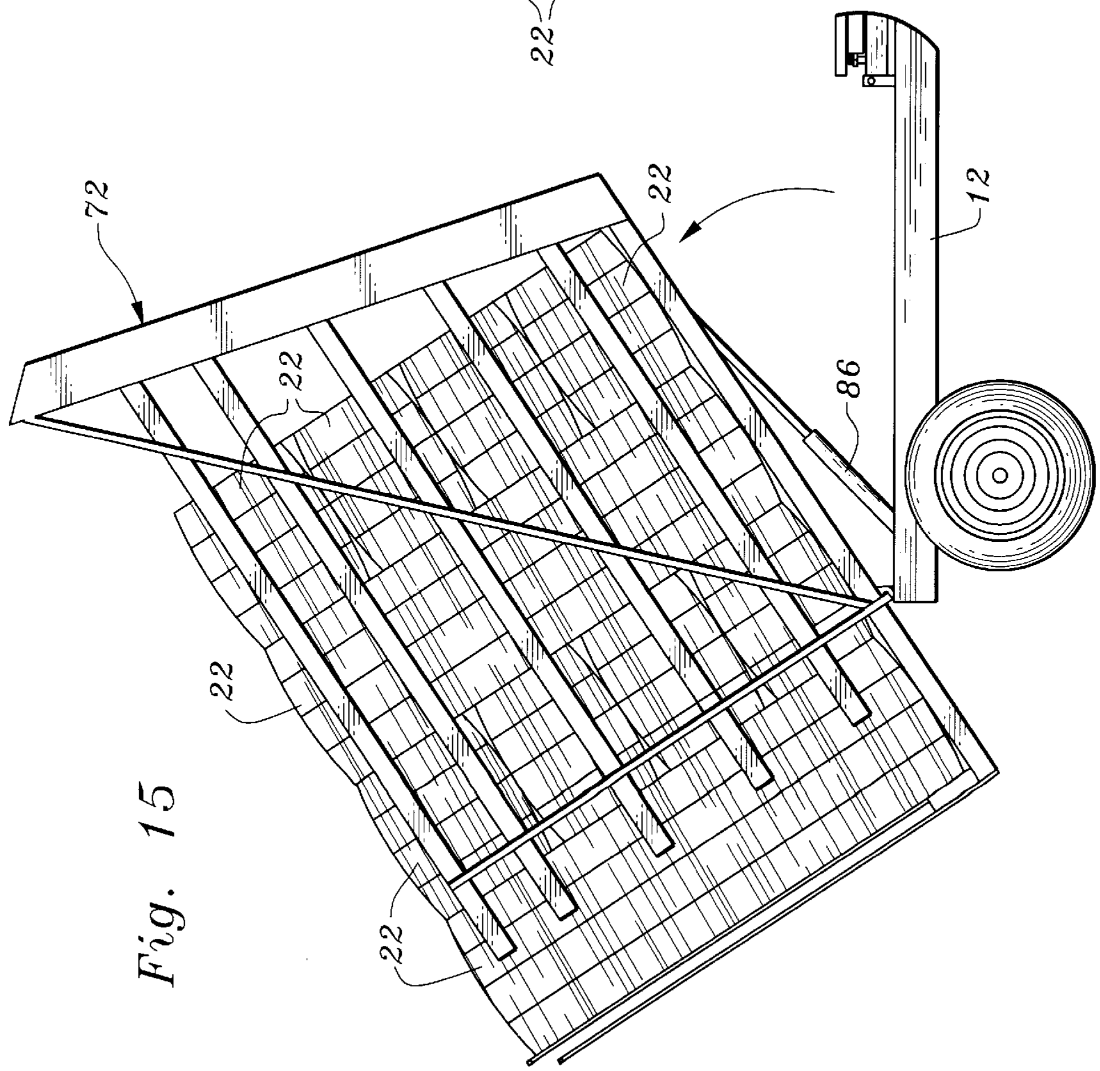
FIG. 15 is a side view illustrating a stack of bales in the storage compartment of the apparatus with the storage compartment being tilted to discharge the stack.

FIG. 15 shows the storage compartment 72 completely filled with bales previously oriented by and discharged from the support platform. The contents of the storage container or compartment is discharged by tipping the compartment relative to the frame 12 and allowing the bales to exit from the rear of the compartment. A pneumatic cylinder 86 may be employed for this purpose. FIG. 16 shows a stack of bales after discharge thereof from the storage compartment.

In the embodiment of the invention just described a plurality of hydraulic cylinders have been utilized to perform various functions. Operation of these hydraulic cylinders may be controlled directly by the operator or automatically. Of course, suitable means other than hydraulic cylinders may be employed to carry out one or more of the disclosed operations if desired.

What is claimed is:

1. Apparatus for retrieving and stacking elongated bales in a multi-tier stack with bales of each tier oriented ninety degrees relative to bales in an adjacent tier of the stack, said apparatus including, in combination:

a mobile frame;

a support platform rotatable mounted on said mobile frame having an upper bale support surface, said upper bale support surface being disposed in a horizontal plane and rotatable in said horizontal plane;

bale engagement and transport means connected to said mobile frame for engaging bales on the ground seriatim during movement of said mobile frame and for individually transporting each engaged bale from the ground to a predetermined location on the upper bale support surface of said support platform;

bale displacement means for contacting a bale supported by said support platform at said predetermined location to displace the bale contacted thereby along the upper bale support surface thereof away from said predetermined location to provide room at said predetermined location for another bale subsequently transported by said bale engagement and transport means to said predetermined location, said bale displacement means including a pusher member movably mounted to said support platform for pushing bales on said upper bale support surface to form a row of bales disposed side by side and oriented in the same direction; and support platform rotating means for rotating the support platform ninety degrees after formation of a row of bales on said upper bale support surface to rotate the upper bale support surface in said horizontal plane and change the orientation of the bales in the row of bales supported thereby ninety degrees.

2. The apparatus according to claim 1 wherein said bale engagement and transport means comprises at least one bale engagement member and lifter means operatively associated with said at least one bale engagement member to lift a bale engaged by said at least one bale engagement member, invert said bale and deposit said bale on the upper bale support surface of said support platform at said predetermined location in upside down condition.

3. The apparatus according to claim 2 wherein said bale engagement and transport means includes two spaced, relatively movable bale engagement members for releasable clamping engagement with opposed bale sides and additionally comprises means for moving at least one of said bale engagement members toward the other of said bale engagement members to clamp a bale therebetween.

4. The apparatus according to claim 2 wherein said lifter means includes prime mover means connected to said at least one bale engagement member and further includes mechanical linkage connected to said at least one bale engagement member and said mobile frame.

5. The apparatus according to claim 4 wherein said prime mover means comprises at least one hydraulic cylinder.

6. The apparatus according to claim 4 wherein said mechanical linkage includes a first link member connected to said at least one bale engagement member and pivotal therewith under the urging of said prime mover means about a first pivot to lift a bale from the ground and tilt the bale end-wise to a first orientation with the bale extending upwardly from a bale end and a second link member operatively associated with said first link member and pivotal about a second pivot along with said first link member and said bale relative to said mobile frame under the urging of said prime mover means to further tilt the bale to upside down condition and deposit said bale on the upper bale support surface of said support platform at said predetermined location in upside down condition.

7. The apparatus according to claim 6 wherein said first orientation of said bale is a generally vertical orientation and wherein said first link member is pivotally movable relative to said second link member during the period of time between lifting of the bale from the ground and tilting of said bale end-wise to said generally vertical orientation.

8. The apparatus according to claim 7 additionally comprising lock means operatively associated with said first and second link members to lock said first and second link members against relative movement after said bale has been tilted end-wise to said first orientation.

9. The apparatus according to claim 6 additionally comprising a bale contact member affixed relative to said first link member and pivotal with said first link member, said bale contact member disposed adjacent to said bale engagement member for contacting an end of a bale.

10. The apparatus according to claim 1 additionally comprising bale storage means supported by said mobile frame adjacent to said support platform for receiving a row of bales from said support platform after formation of said row of bales on said support platform.

11. The apparatus according to claim 10 additionally comprising means for tilting said support platform relative to said mobile frame to discharge said plurality of bales on end to said bale storage means.

12. The apparatus according to claim 11 wherein said means for tilting said support platform includes a hydraulic cylinder connected to said support platform.

13. The apparatus according to claim 1 wherein said support platform rotating means includes a hydraulic cylinder connected to said support platform.

14. The apparatus according to claim 1 additionally comprising hydraulic cylinder means connected to said pusher member to move said pusher member.

15. Apparatus for retrieving and stacking bales, said apparatus including, in combination:

a mobile frame;

a support platform connected to said mobile frame having an upper bale support surface;

bale engagement and transport means connected to said mobile frame for engaging bales on the ground seriatim during movement of said mobile frame and for individually transporting each engaged bale from the ground to a predetermined location on the upper bale support surface of said support platform;

bale displacement means for contacting a bale supported by said support platform at said predetermined location to displace the bale contacted thereby along the upper bale support surface thereof away from said predetermined location to provide room at said predetermined location for another bale subsequently transported by said bale engagement and transport means to said predetermined location, said bale engagement and transport means comprising at least one bale engagement member and lifter means operatively associated with said at least one bale engagement member to lift a bale engaged by said at least one bale engagement member, invert said bale and deposit said bale on the upper bale support surface of said support platform at said predetermined location in upside down condition, said lifter means including prime mover means connected to said at least one bale engagement member and further including mechanical linkage connected to said at least one bale engagement member and said mobile frame, said mechanical linkage including a first link member connected to said at least one bale engagement member and pivotal therewith under the urging of said prime mover means about a first pivot to lift a bale from the ground and tilt the bale end-wise to a first orientation with the bale extending upwardly from a bale end and a second link member operatively associated with said first link member and pivotal about a second pivot along with said first link member and said bale relative to said mobile frame under the urging of said prime mover means to further tilt the bale to upside down condition and deposit said bale on the upper bale support surface of said support platform at said predetermined location in upside down condition, said first orientation of said bale being a generally vertical orientation and said first link member being pivotally movable relative to said second link member during the period of time between lifting of the bale from the ground and tilting of said bale end-wise to said generally vertical orientation; and lock means operatively associated with said first and second link members to lock said first and second link members against relative movement after said bale has been tilted endwise to said first orientation.

16. The apparatus according to claim 15 wherein said lock means comprises a lock member pivotally attached to one of said link members and responsive to pivotal movement of said second link member to lock said first and second link members against relative movement.

* * * * *